United States Patent Office 2,788,334
Patented Apr. 9, 1957

2,788,334

POROUS ARTICLE DERIVED FROM BUTADIENE-STYRENE COPOLYMER LATEX AND POLYBUTADIENE LATEX

Bailey Bennett, Columbus, and George H. McFadden, Worthington, Ohio, assignors to General Motors Corporation, Detroit, Mich., a corporation of Delaware No Drawing. Application July 23, 1953,
Serial No. 369,952

5 Claims. (Cl. 260—2.5)

This invention relates to vulcanized latex foam and articles made thereof and is particularly directed to vulcanized foams and articles therefrom made entirely from synthetic polymers such as butadiene-styrene copolymers and the like.

This application is a continuation-in-part of our copending application Serial No. 203,198, filed December 28, 1950 and now abandoned.

It is, therefore, an object of the invention to provide a vulcanized synthetic latex foam which has properties approaching vulcanized natural latex foam.

In carrying out the above object, it is a further object of the invention to provide a method for making foamed latex articles from said foam.

A still further object of the invention is to provide a vulcanized foamed latex article and method for making same wherein butadiene-styrene copolymer forms a substantial portion of the article and wherein modifying synthetic latices are added for controlling the physical properties thereof.

In carrying out the above object, it is a further object of the invention to modify the physical characteristics of an article made of vulcanized foamed butadiene-styrene copolymer latex wherein additions of polybutadiene latex are made in controlled quantities, for modifying the resilience of the article over a wide range of temperatures.

A still further object of the invention is to provide an article made from vulcanized foamed synthetic latex, specifically a mixture of butadiene-styrene copolymer latex and polybutadiene latex, wherein the polybutadiene latex percentage ranges from 10 to 50% of the total latex used.

A still further object of the invention is to provide an article made from vulcanized butadiene-styrene copolymer latex and a method of making such an article wherein the entire article is made from a synthetic latex and wherein the resilience and other physical characteristics thereof are modified so as to approach the physical characteristics of an article made of vulcanized foamed natural latex.

Further objects and advantages of the present invention will be apparent from the following description.

There has always been considerable difficulty in forming articles from certain latex foams. It is a known fact that articles formed from neoprene latex have reasonably good physical characteristics but articles formed from butadiene-styrene copolymer latex foam have always lacked the "feel" of an article made from a natural rubber latex foam. This "feel" is evidenced in the physical characteristics of the article, particularly the resilience thereof. Foamed latex articles made from foamed butadiene-styrene copolymer latex are quite satisfactory at elevated temperatures but when the temperature is decreased, the article loses its resilience and becomes dead to the feel having no satisfactory comeback upon compression.

This peculiar physical characteristic of vulcanized foamed butadiene-styrene copolymer latex has retarded its use, since wherever foamed rubber articles are to be used, they must react properly over a wide range of temperatures.

It is apparent that due to the cost of butadiene-styrene copolymer latex, it is one of the most desirable of latices for commercial use. Furthermore, the commercial production of this type of latex far exceeds the production of any other synthetic latex.

In order to obviate the difficulties experienced with butadiene-styrene copolymer latex when foamed and vulcanized, we have found that additions of a specific synthetic latex to butadiene-styrene copolymer latex modifies the characteristics of vulcanized foamed latex articles made therefrom sufficiently to provide a satisfactory article for commercial use. Specifically the addition of polybutadiene latex is proposed in specific quantities in order to modify the final characteristics of a combination which includes polybutadiene latex and butadine-styrene copolymer latex as the entire latex ingredient. The addition of polybutadiene latex markedly increases the resiliency of vulcanized foamed latex articles made from the mixture over like articles made from 100% butadiene-styrene copolymer latex foam.

We have found that additions varying from 10 to 50% of polybutadiene latex (having a solids content of about 45%) to butadiene-styrene copolymer latex (of 55% solids or above) produce a latex which, when compounded, foamed and cured, provides an article that has increasing resilience in proportion to the quantities of polybutadiene latex used.

In practice we have found that any of the commercial butadiene-styrene copolymer latices are satisfactory for use in the process to be described hereinafter. Such latices as Lotol 5010-C (obtainable from the U. S. Rubber Company, Naugatuck Division), GRS type 4 (50% butadiene-50% styrene, 50 to 60% solids) or any other butadiene-styrene copolymer latex, which will meet the requirements hereinafter set forth, will provide satisfactory results.

Properties of Lotol 5010-C are as follows:

Total solids concentration____ 55.0% minimum.
Hydrogen ion concentration 10.5–11.0.
  (pH).
Particle size and charge ____ Approx. 0.15 micron—negative.
Styrene in polymer_____ Approx. 45.5%.
Mooney viscosity of poly- 80–100.
  mer.

GRS type 4 is also known as Polysar S latex 4 (Canada) and is an equivalent of a heat concentrated X230 latex as defined in the U. S. Rubber Reserve Code.

The polybutadiene latex similarly is not critical in composition of polymerization ingredients, the main factors being that the latex is of an alkaline nature, preferably having a pH in the order of 10.5, which pH may be adjusted with caustic or other suitable reagents. In all cases, it is desirable, though not essential, to have a reasonably high solids content since one requirement which must be adhered to is the final solids content of the combined latices which must be 50% or more. Thus, if the butadiene-styrene copolymer latex having a solids content of 55% is utilized, it is necessary that the polybutadiene latex has a solids content of at least 45%, if a 50–50 mixture is to be used. On the other hand, if a 90% butadiene-styrene copolymer latex, 10% polybutadiene latex mixture is used it is obvious that the solids in the polybutadiene latex may be much lower than 45%, for example, polybutadiene from Recipe #3, may be used wherein 10% polybutadiene having a solids content of approximately 26% together with 90% of butadiene-styrene copolymer latex having a solids content of 55%. Similarly, 38% solids polybutadiene may be used in quantities of 20% with 80% butadiene-styrene copolymer latex having a solids content of 55%. In each case, the total solids content of the mixture will be above 50% which is one of the requirements of this invention.

It is further apparent that high solids polybutadiene latices (as made by usual concentration processes) may be used wherein the solids content ranges up to 56%. In this case, 30% of polybutadiene latex having a 56% solids content may be mixed with 70% of a butadiene-styrene copolymer latex having a solids content of 55%. This yields a final product having 55+% solids.

In general, however, a relatively high solids content in the polybutadiene latex is desirable, although not necessarily controlling so long as the final solids in the latex mixture used for compounding and foaming is 50% or more. To illustrate the wide variation in polymerization ingredients which may be used to make the polybutadiene latex the following recipes are given, which recipes are used in emulsion polymerization processes to form a polybutadiene latex in which the contained polymer has a viscosity average molecular weight of about 400,000 to 500,000 as distinguished from the syrupy type of polymers whose molecular weight is generally below 100,000. This viscosity may be measured with an Oswald type capillary viscometer or by any other suitable means.

Recipe #1
(All parts by weight)

| | Parts |
|---|---|
| Water | 40.0 |
| Baker's K castor oil soap 35% solution | 5.0 |
| Darvan #1 (sodium salt of polyalkyl aryl sulfonic acid) | 1.0 |
| Fructose | 0.25 |
| Cumene hydroperoxide, 70% | 0.12 |
| Ferric sulfate | 0.0085 |
| Potassium pyrophosphate | 0.93 |
| t-Dodecyl mercaptan | 0.2 |
| Butadiene | 50.0 | pH of water phase adjusted to 10.5 with sodium hydroxide.
Polymerization time about 5 hours.
Polymerization temperature, 50° C.
Solids content, 48.6%.

Recipe #2
(All parts by weight)

| | Parts |
|---|---|
| Water | 85.0 |
| Sodium stearate | 2.15 |
| Potassium persulfate | 0.15 |
| t-Dodecyl mercaptan | 0.2 |
| Butadiene | 50.0 |

Latex alkaline, preferably above 9.8.
Polymerization time, 40 hours.
Polymerization temperature, 50° C.
Solids content, 38%.

Recipe #3
(All parts by weight)

| | Parts |
|---|---|
| Water | 90.0 |
| Potassium oleate | 2.15 |
| Potassium persulfate | 0.2 |
| Potassium ferricyanide | 0.1 |
| Sodium hydroxide | 0.04 |
| t-Dodecyl mercaptan | 0.2 |
| Butadiene | 50.0 | pH of latex, 11.
Polymerization time, 20 hours.
Polymerization temperature, 50° C.
Solids content, 26%.

The polymerization temperature of 50° C. appears to be one of the most satisfactory temperatures for the reaction, although satisfactory latices have been made at temperatures as low as 5° C. and this figure is in no way critical but may vary according to the conditions of polymerization and time consumed during the reaction.

The butadiene-styrene copolymer latex may vary over wide ranges of butadiene-styrene percentages in the initial reaction mixture although commercial charge ratios utilize styrene from 5 to 50% and any latex made within these limits will be satisfactory. It is obvious that the resilience figures to be noted hereinafter will vary with the percentages of styrene and butadiene-styrene copolymer, all of the figures listed here having been obtained utilizing a Lotol 5010-C latex which is readily available in commercial grades. However, in every case the resilience of the mixture will be a definite improvement of the butadiene-styrene copolymer alone.

In the compounding of vulcanizable latex foams, the following ingredients are used:

| | |
|---|---|
| Lotol 5010-C | Varying. |
| Polybutadiene (Recipe #1) [1] | Varying. |
| Master batch (Recipe #4) | 57 parts by weight. |
| Potassium castor oil soap 35% | 8–12 parts by weight. |
| Glass fiber 1/8" | 9 parts by weight. |
| pHR, 20% solution (amino acetic acid) | 25 parts by weight. |
| Sodium fluotitanate 40% suspension | 15–25 parts by weight. |

[1] 48% solids as made by Recipe #1.

In the above recipe the use of glass fiber may vary or may be omitted, particular advantage of said use being set forth in Patent #2,498,785, assigned to the assignee here. Instead of pHR any satisfactory buffer may be used which will adjust the pH of the mixture within the desired range. In place of sodium fluotitanate other fluotitanates as noted in Patent #2,472,054, or fluozirconates as noted in Patent #2,472,055, may be used or sodium fluosilicate or other gelling agent in quantities and used in accordance with usage well known in the art. Furthermore, additions of petrolatum emulsion or casein solution may be used for density control and foam stability control, all of these variations being well known. The master batch as noted in Recipe #4 hereinafter set forth may vary widely, the specific formula being given merely to set forth the conditions under which the test samples hereinafter noted were made.

Recipe #4

| | Parts by weight |
|---|---|
| Zinc oxide | 600 |
| Titanium oxide | 120 |
| Sulphur | 300 |
| Zinc mercaptobenzothiazole | 150 |
| Piperidinium pentamethylene dithiocarbamate | 90 |
| Zinc diethyl dithiocarbamate | 60 |
| Symmetrical dibetanaphthyl-p-phenylenediamine | 90 |
| Ammoniacal casein solution (10%) | 525 |
| Darvan #1, 10% solution (sodium salt of polyalkyl aryl sulfonic acid) | 358 |

In each case, the foam was brought to a satisfactory height, was filled into a mold, gelled, cured in open steam for 30 minutes at 100° C. whereupon the foamed articles were dried and tested with the following results:

COMPOSITION

| Percent Lotol | Percent Polybutadiene | Resiliency |
|---|---|---|
| 100 | | 15.0 |
| 90 | 10 | 16.2 |
| 80 | 20 | 17.7 |
| 70 | 30 | 19.7 |
| 60 | 40 | 23.0 |
| 50 | 50 | 27.0 |

The polybutadiene in the above table is the type made by Recipe #1 and includes about 48% solids, while the Lotol is the 5010-C type.

In all cases, the test samples were approximately 14 x 14 x 3.6 cm. and the densities were substantially constant. All resiliency figures are Bashore resiliometer readings and represent the average of at least four tests, all tests at 28° C. In each case, the samples were compressed to a thickness of 1.8 cm. from 3.6 cms. free thickness. From these figures it will be seen that the resilience of the test samples markedly increased as the percentage of polybutadiene latex in the compound increased and that even when 10% polybutadiene latex was present, the resilience was improved over a 100% butadiene-styrene copolymer latex test sample.

In order to demonstrate the increase in resilience over a wide range of temperatures, the following figures are given, the resilience test being conducted identically to those noted heretofore and with the same test samples:

COMPOSITION

[Tests at 15° C. (59° F.).]

| Percent Lotol | Percent Polybutadiene | Resiliency |
|---|---|---|
| 100 | ---- | 0.5 |
| 90 | 10 | 1.5 |
| 80 | 20 | 3.5 |
| 70 | 30 | 5.8 |
| 60 | 40 | 6.9 |
| 50 | 50 | 10.0 |

[Tests at 82° C. (179.6° F.).]

| Percent Lotol | Percent Polybutadiene | Resiliency |
|---|---|---|
| 100 | ---- | 33.4 |
| 90 | 10 | 38.6 |
| 80 | 20 | 38.8 |
| 70 | 30 | 41.0 |
| 60 | 40 | 43.0 |
| 50 | 50 | 48.4 |

The polybutadiene used in this series of tests was made by Recipe #1 and includes about 48% solids. The Lotol is the 5010-C type.

It will be noted from the results of these tests that the resiliency of a wide range of temperatures is markedly improved by the addition of polybutadiene latex and that the resilience of vulcanized synthetic foamed latex articles is most improved when 30% to 50% of polybutadiene latex is added to a butadiene-styrene copolymer latex.

The results of four different compositions are noted hereinafter wherein physical characteristics are listed:

| Percent Lotol | Percent Polybutadiene | Shore A | Tensile (p. s. i.) | Elongation, Percent | Modulus (p. s. i. at 300%) |
|---|---|---|---|---|---|
| 100 | ---- | 41 | 743 | 475 | 357 |
| 80 | 20 | 39 | 520 | 530 | 180 |
| 60 | 40 | 39 | 356 | 422 | 205 |
| 50 | 50 | 41 | 350 | 400 | 242 |

All test slabs compounded and cured under identical conditions. The polybutadiene used in this series of tests was made by Recipe #1 and includes about 48% solids. The Lotol is the 5010-C type.

From the figures listed above it will be noted that at the greatest resiliency, namely a 50-50 mixture, that the tensile strength is still satisfactory for cushion material while the elongation has not changed markedly, although somewhat reduced, and the modulus at 300% elongation has dropped off slightly. It will be noted in all cases that the Shore A hardness is substantially constant. In the above tests all samples were tested in accordance with standard A. S. T. M. methods for tension testing of vulcanized rubber.

In all cases butadiene-styrene copolymer latex forms the basic ingredient of the latex mixture due to the fact that even with 50-50 latex mixture the solids content of the butadiene-styrene copolymer latex is preferably above 50% while the solids content of the polybutadiene latex is preferably below 50%.

From the aforegoing, fifty percent polybutadiene latex addition to butadiene-styrene copolymer latex is the prefered maximum addition. In this respect, it is to be observed that as the resiliency of the composition is improved, the tensile strength thereof is reduced. For this reason it is necessary to utilize a composition wherein the resiliency is at the most desirable figure compatible with other physical characteristics of the article. In other words, a balance between the resiliency and other physical characteristics forms the basis for the limtis of the polybutadiene addition. It has been found that tensile strength drops off as the percentage of polybutadiene increases; that elongation drops off slightly and that the modulus at 300% elongation decreases slowly. Thus, with the exception of the resilience, the remaining physical characteristics of the composition foam are decreased, whereby it is necessary to choose a maximum, addition figure which yields satisfactory physical characteristics together with a useful resiliency.

While the embodiment of the present invention as herein disclosed, constitutes a prefered form, it is to be understood that other forms might be adopted.

What is claimed is as follows:

1. In a method of controlling the physical characteristics of the resilient foamed latex articles made from compounded, foamed and vulcanized synthetic latex wherein a rubbery butadiene-styrene copolymer latex including at least 50% solids therein is the basic latex ingredient, the step comprising, mixing therewith polybutadiene latex in which the contained polymer has a molecular weight of about 400,000 to 500,000 in percentages of 10 to 50% of the total weight latex to be foamed, said polybutadiene latex having a solids content sufficient to bring the solids content of the mixed latex to at least 50% by weight whereby the resilience of the article is markedly improved.

2. In a method of controlling the physical characteristics of the resilient foamed latex articles made from compounded, foamed and vulcanized synthetic latex wherein a rubbery butadiene-styrene copolymer latex having a solids content of about 55% by weight is the basic ingredient, the step comprising, mixing polybutadiene latex in which the contained polymer has a molecular weight about 400,000 to 500,000 and a solids content of between 45 and 49% by weight of the total latex to be foamed whereby the solids content of the mixed latex is maintained to at least 50% whereby the resilience of the article is markedly improved.

3. In a method of controlling the resilience of articles made essentially from rubbery butadiene-styrene copolymer latices having solids contents of 50% and above wherein the latex is compounded, foamed and vulcanized, the step of modifying the resilience of the vulcanized article by polybutadiene latex additions to the butadiene-styrene copolymer latex in the initial mixture of latices to be foamed wherein the contained polymer in said polybutadiene latex has a molecular weight about 400,000 to 500,000 and wherein the total latex mixture is of an alkaline character and has a solids content of at least 50% by weight and wherein the butadiene-styrene copolymer latex makes up the major ingredient of latex by weight and within the range of 50 to 90% by weight of the mixture.

4. In a method of controlling the resilience of articles made essentially from rubbery butadiene-styrene copolymer latex wherein the latex is compounded, foamed and vulcanized, the step of modifying the resilience of the vulcanized article by adding polybutadiene latex in quantities of 10 to 50% by weight in which the contained polymer has a molecular weight about 400,000 to 500,000 and a solids content above 45% and below 50% by weight to a butadiene-styrene copolymer latex in quantities of from 90 to 50% by weight and having a solids content above 50% and wherein the mixed latex is of an alkaline character and has a solids content of at least 50%.

5. A new article of manufacture comprising a vulcanized, foamed resilient latex article wherein the initial latex ingredient consisted of an alkaline mixture of a rubbery, butadiene-styrene copolymer latex having a solids content of at least 55% in proportions of from 90 to 50% by weight and a polybutadiene latex in which the contained polymer has a molecular weight about 400,000 to 500,000 in proportions of 10 to 5% by weight and wherein the entire mixed latex ingredient has a solids content of at least 50% by weight.

References Cited in the file of this patent

UNITED STATES PATENTS

| | | |
|---|---|---|
| 2,484,434 | Van Buskirk et al. | Oct. 11, 1949 |
| 2,512,697 | Te Grotenhuis | June 27, 1950 |
| 2,560,031 | Cline | July 10, 1951 |

FOREIGN PATENTS

| | | |
|---|---|---|
| 492,998 | Great Britain | Sept. 30, 1938 |